United States Patent
Meirav et al.

(10) Patent No.: US 10,143,959 B2
(45) Date of Patent: Dec. 4, 2018

(54) REGENERABLE SORBENT CARTRIDGE ASSEMBLIES IN AIR SCRUBBERS

(71) Applicant: ENVERID SYSTEMS, INC., Needham, MA (US)

(72) Inventors: Udi Meirav, Newton, MA (US); Israel Biran, Avihayil (IL); Asael Meruham, Beit-Dagan (IL); Jacob Jacobi, Zichron-Yaacov (IL)

(73) Assignee: ENVERID SYSTEMS, INC., Needham, MA (US)

( * ) Notice: Subject to any disclaimer, the term of this patent is extended or adjusted under 35 U.S.C. 154(b) by 0 days.

(21) Appl. No.: 15/118,829

(22) PCT Filed: Feb. 12, 2015

(86) PCT No.: PCT/US2015/015690
§ 371 (c)(1),
(2) Date: Aug. 12, 2016

(87) PCT Pub. No.: WO2015/123454
PCT Pub. Date: Aug. 20, 2015

(65) Prior Publication Data
US 2017/0056812 A1    Mar. 2, 2017

Related U.S. Application Data

(60) Provisional application No. 61/938,705, filed on Feb. 12, 2014, provisional application No. 62/046,174, filed on Sep. 5, 2014.

(51) Int. Cl.
*B01D 53/02* (2006.01)
*B01D 53/04* (2006.01)
*F24F 13/28* (2006.01)

(52) U.S. Cl.
CPC ..... *B01D 53/0415* (2013.01); *B01D 53/0462* (2013.01); *B01D 2253/102* (2013.01);
(Continued)

(58) Field of Classification Search
CPC ........ B01D 2253/102; B01D 2253/116; B01D 2253/20; B01D 2253/304; B01D 2253/34;
(Continued)

(56) References Cited

U.S. PATENT DOCUMENTS

| 4,292,059 A | 9/1981 | Kovach |
| 4,917,862 A | 4/1990 | Kraw et al. |

(Continued)

FOREIGN PATENT DOCUMENTS

| WO | WO 2010/027868 A2 | 3/2010 |
| WO | WO 2012/158911 A2 | 11/2012 |

OTHER PUBLICATIONS

International Search Report and Written Opinion, dated May 15, 2015 for International Application No. PCT/US2015/015690, filed Feb. 12, 2015.

*Primary Examiner* — Christopher P Jones
(74) *Attorney, Agent, or Firm* — Cooley LLP

(57) ABSTRACT

A regenerable air scrubbing system comprises of an air flow assembly with replaceable cartridges arranged in a parallel orientation and designed for easy insertion and removal of the cartridges. The cartridge design enhances the contact area, reduces the pressure drop, and readily allows the design of similar assemblies with different airflow throughputs using the same cartridge, while facilitating easy replacement of the sorbent in the field. The cartridge can be partitioned into smaller compartments, improving the mechanical properties of the cartridge and the uniformity of the sorbent distribution.

20 Claims, 11 Drawing Sheets

(52) U.S. Cl.
CPC .... *B01D 2253/116* (2013.01); *B01D 2253/20* (2013.01); *B01D 2253/304* (2013.01); *B01D 2253/34* (2013.01); *B01D 2253/3425* (2013.01); *B01D 2257/11* (2013.01); *B01D 2257/302* (2013.01); *B01D 2257/404* (2013.01); *B01D 2257/502* (2013.01); *B01D 2257/504* (2013.01); *B01D 2257/708* (2013.01); *B01D 2257/91* (2013.01); *B01D 2258/06* (2013.01); *B01D 2259/4009* (2013.01); *B01D 2259/40086* (2013.01); *B01D 2259/40088* (2013.01); *B01D 2259/4508* (2013.01); *B01D 2259/4566* (2013.01); *F24F 13/28* (2013.01); *Y02C 10/08* (2013.01)

(58) Field of Classification Search
CPC ........ B01D 2253/3425; B01D 2257/11; B01D 2257/302; B01D 2257/404; B01D 2257/502; B01D 2257/504; B01D 2257/708; B01D 2257/91; B01D 2258/06; B01D 2259/40086; B01D 2259/40088; B01D 2259/4009; B01D 2259/4508; B01D 2259/4566; B01D 53/0415; B01D 53/0462; F24F 13/28; Y02C 10/08

See application file for complete search history.

(56) References Cited

U.S. PATENT DOCUMENTS

| | | |
|---|---|---|
| 7,407,533 B2 | 8/2008 | Steins |
| 8,157,892 B2 | 4/2012 | Meirav |
| 8,690,999 B2 | 4/2014 | Meirav et al. |
| 2011/0198055 A1 | 8/2011 | Meirav et al. |
| 2011/0206572 A1 | 8/2011 | McKenna et al. |
| 2012/0216676 A1 | 8/2012 | Addiego et al. |
| 2012/0222500 A1 | 9/2012 | Riess et al. |

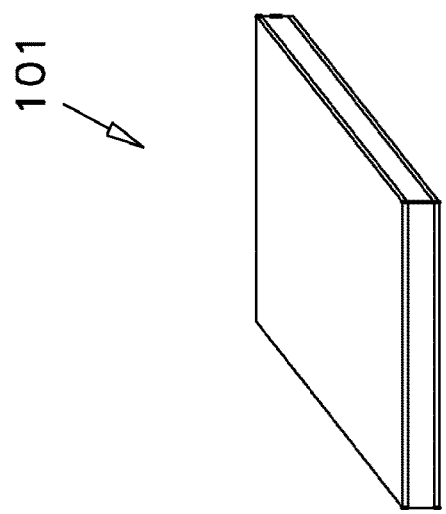
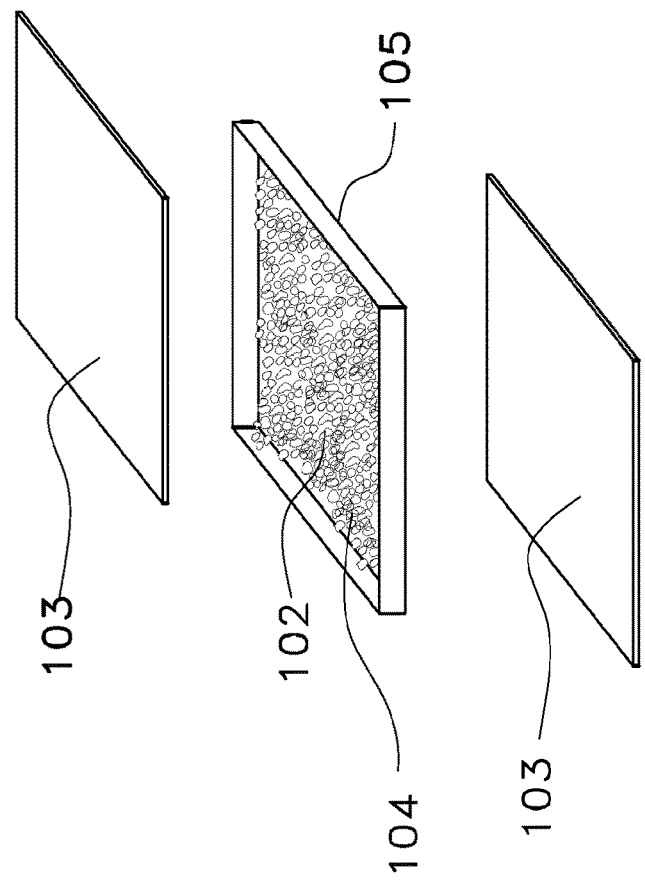

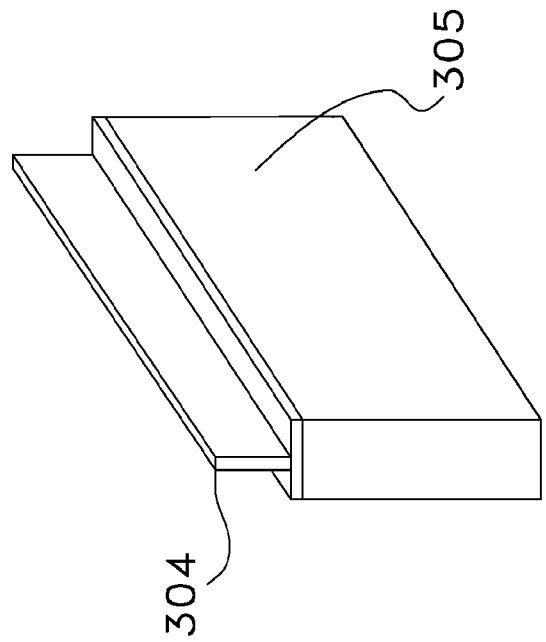
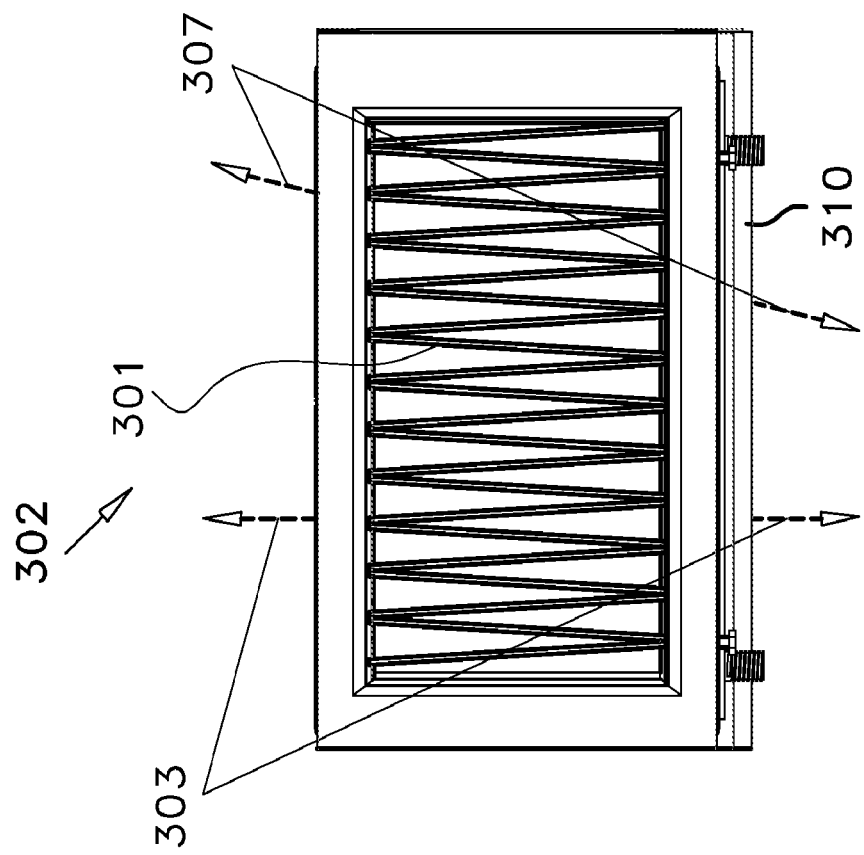
FIG. 3B
FIG. 3A

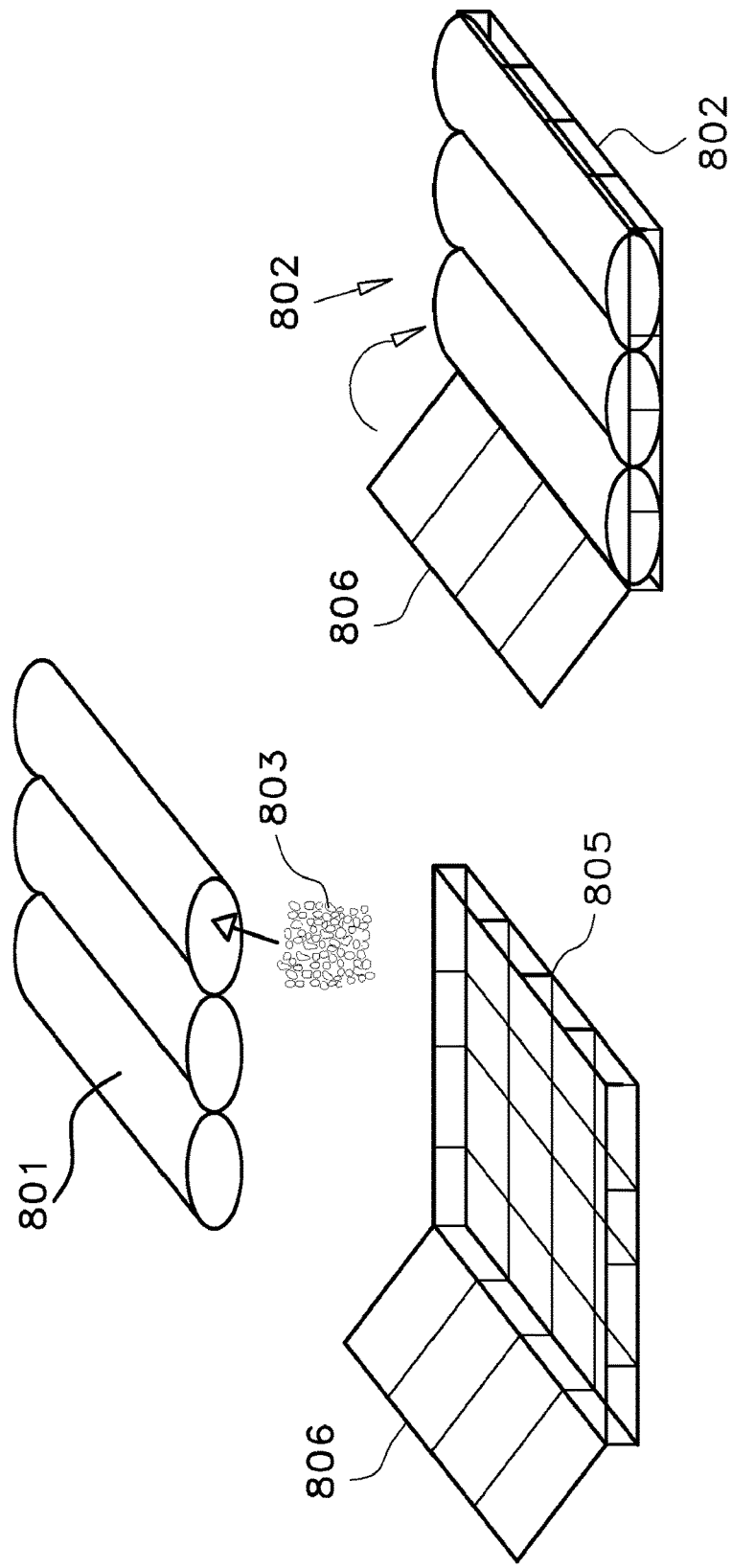

REGENERABLE SORBENT CARTRIDGE ASSEMBLIES IN AIR SCRUBBERS

CROSS REFERENCE TO RELATED APPLICATIONS

This application claims priority to U.S. Provisional Patent Application No. 61/938,705, entitled "Enclosure Assemblies in Airflow Systems," filed Feb. 12, 2014, and U.S. Provisional Patent Application No. 62/046,174, titled "Vertical Enclosure Assemblies in Airflow Systems," filed Sep. 5, 2014, both disclosures of which are incorporated by reference herein in their entireties.

FIELD OF THE DISCLOSURE

The present application generally relates to enclosure assemblies in airflow systems, and in particular regenerable sorbent assemblies in cartridges in air scrubbing systems.

BACKGROUND

Indoor air within buildings and other closed spaces can be affected by a plurality of substances comprising contaminants. In order to maintain good air quality, the circulating air should be refreshed, either by continually replacing it with fresh air, or by removing the unwanted contaminants, or both.

SUMMARY OF SOME OF THE EMBODIMENTS

Embodiments of a cartridge configured for scrubbing indoor air and regeneration in an air handling assembly are disclosed herein. Some embodiments comprise a pair of opposed, substantially flat parallel surfaces configured in a geometric shape and configured with air-permeable surfaces. Further, a frame arranged between the surfaces and configured to maintain the shape of the cartridge, and a plurality of partition walls arranged as part of, within, or comprising the frame, the plurality of walls configured to create a plurality of adjacently arranged compartments are included. In some embodiments, the plurality of walls are configured to provide structural strength to the cartridge and inhibit redistribution or motion of sorbent between compartments, and the surfaces are configured to allow air to flow through the sorbent contained within the compartments. In addition, the cartridge may be configured for opening thereof to remove and replace a sorbent therein. For example, a solid sorbent, including those encased by air permeable packets, may be contained within the plurality of compartments and between the two surfaces. In some embodiments, the sorbent contains organic amines for capture of carbon dioxide. Further, the sorbent may be formed into a shaped monolith with such shape and size so as to match and fill the compartments. In some embodiments, the sorbent may be a granular material with a particle size of between about 0.1 mm to about 10 mm. In some embodiments, the cartridges may be sized so that the thickness of the cartridge is between about 0.5 centimeters and about 10 centimeters.

In some embodiments, some of the partitions form a honeycomb pattern of repeated similar geometrical shapes comprising squares, rectangles, hexagons or triangles or a combination thereof. The partitions may also be straight walls extending from one edge of the cartridge to its facing edge, wherein the partition walls are configured with perpendicular features to affect air flow or to facilitate the attachment of a screen.

In some embodiments, the partitions and frame comprise a single structure made of at least one of a polymer, plastic, composite material, a material produced by injection molding and a material produced by a molding technique. In addition, the frame and the partitions can be made partly or substantially of cellulose fibers such as paper, cardboard or wood-based materials. The frame also comprises external features extending along one or more of its edges, the edges comprising at least one of: ridges, protrusions, rims, tabs, tracks, grooves and indentations that are configured to facilitate the insertion of the cartridge into the assembly or secure each cartridge's position in the assembly. For example, the features may extend along one or more of the edges of the frame and are configured to fit into and slide along matching rails or grooves to allow the cartridge to slide into and out of the assembly.

In some embodiments, the air-permeable surfaces are created or reinforced by at least one of a filter material, fiber sheet, polymer sheet, paper, screen, mesh and a perforated sheet. They can also be made of a polymer mesh and attached to the frame or to the partitions by ultrasonic or thermal welding.

In some embodiments, an assembly for removable sorbent cartridges in a self-regenerating air treatment system with a primary air flow direction that is substantially in a longitudinal direction is disclosed. In some embodiments, the primary air flow direction can be substantially horizontal or substantially vertical. Such an assembly may comprise a plurality of substantially planar rectangular cartridges arranged in a substantially parallel orientation to a primary air stream, with a tilt of no more than about 15 degrees relative to the primary air flow direction. Further, it may include a housing configured with internal structures comprising at least one of grooves, guides or channels configured to receive edges of the cartridges, the cartridge edges comprising two longitudinal edges and two lateral edges, wherein, fitting of the cartridges within the housing is configured such that air passages between adjacent cartridges are substantially blocked on both longitudinal edges and at least one lateral edge so as to force the air stream to pass through the cartridges.

In some embodiments, the at least one of the cartridge edges and assembly features can have profiles that interlock so as to provide a mechanically secure and/or air-tight connection. Further, an air passage blocking configuration can be created along one or more of the edges of the cartridge via at least one of foam, felt, rubber or a deformable material that is configured in the assembly so as to come into contact with at least one of the cartridge edges.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A-B show a cartridge in its exploded and assembled arrangements according to some embodiments.

FIGS. 3A-B show a front view of an air scrubbing system comprising a plurality of vertically oriented cartridges, and of a cartridge configured for vertical orientation in an air scrubbing system, according to some embodiments.

FIGS. 8A-B show cartridges configured for encasing replaceable sorbents according to some embodiments.

DETAILED DESCRIPTION OF SOME OF THE EMBODIMENTS

Figure 2:
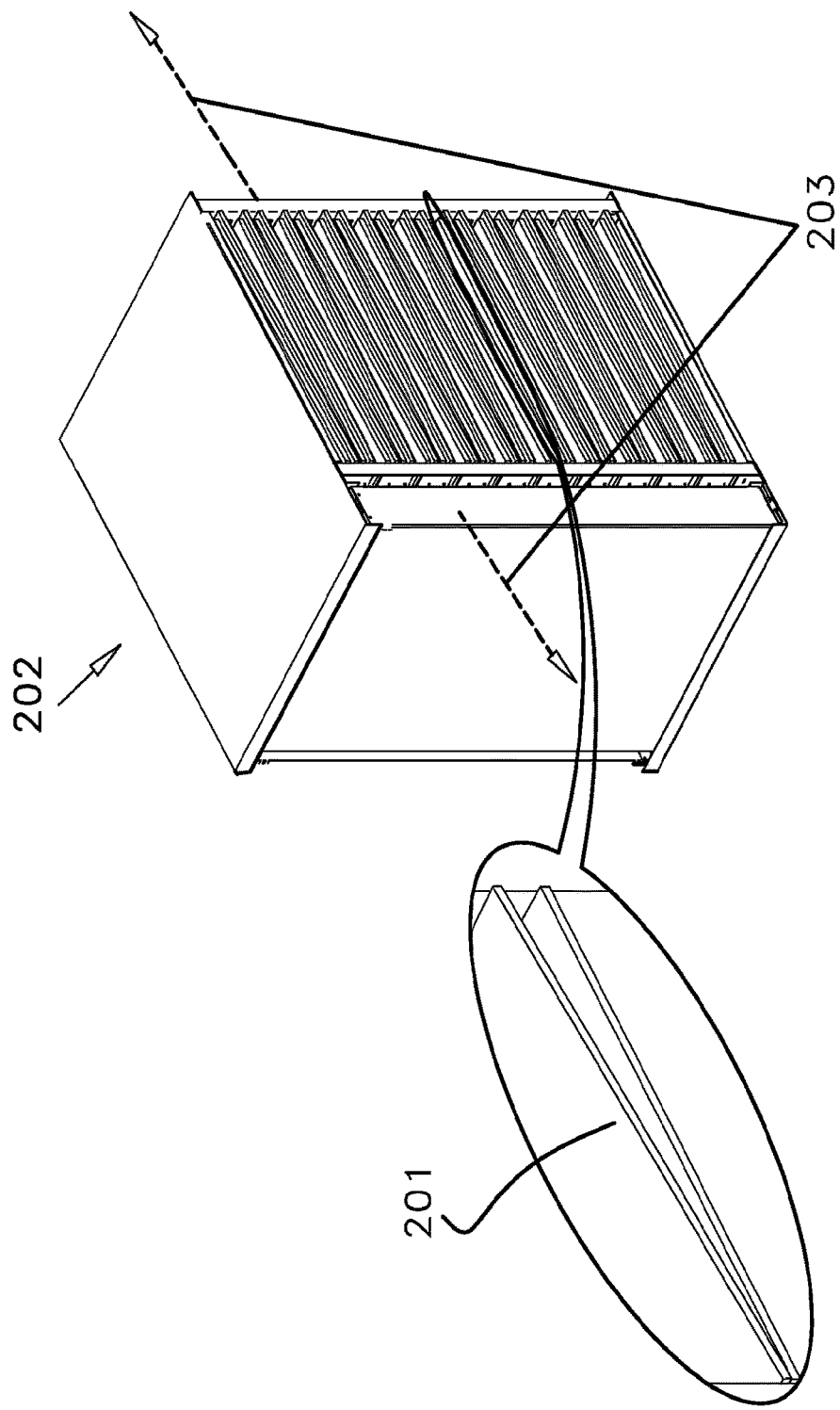
FIG. 2 shows a side view of an air scrubbing system comprising a plurality of horizontally oriented cartridges according to some embodiments.
Figure 4A:
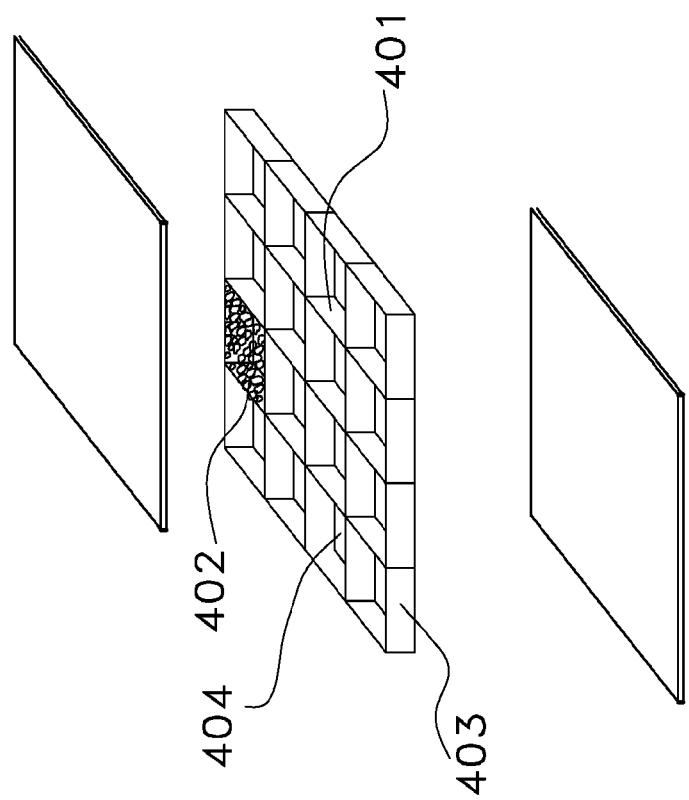
FIGS. 4A-D show cartridges partitioned into a plurality of geometrically shaped compartments according to some embodiments.
Figure 4C:
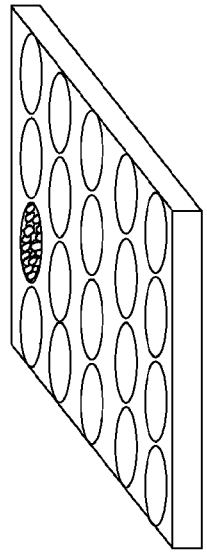
Figure 4D:
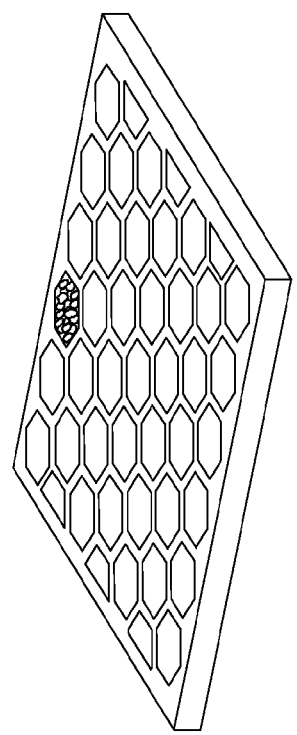
Figure 4B:
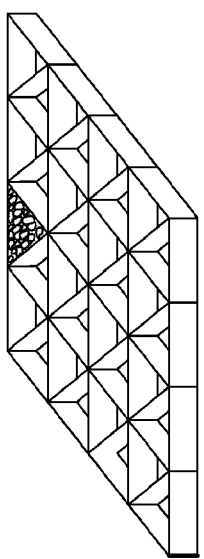

In some embodiments of the present disclosure, an airflow scrubbing system used for treating and conditioning contaminated air is disclosed. The contaminated air may be indoor air within closed or semi-closed spaces (e.g., buildings, vehicles, vessels, etc.), and the contamination may be any unwanted substance in the air that may have originated from occupants of the enclosed space, building materials, food, consumer products (e.g., cleaning products, etc.), and/or the like. Examples of such air contaminants include inorganic compounds, organic vapors, micro-organisms such as but not limited to bacteria, viruses, mold, fungi, airborne particles, etc., gases such as but not limited to carbon dioxide, carbon monoxide, sulfur oxide, nitrous oxide, radon, etc., and/or the like. In some embodiments, the airflow scrubbing system may comprise a scrubber (e.g., a cartridge) that contains a sorbent configured to remove unwanted gas contaminants from the air stream. For example, the stream of air may flow through the cartridge and come in contact with the sorbent material, to which the contaminants get attached to and thus are removed from the air stream. In some embodiments, the airflow scrubbing system may be configured to switch to a regeneration mode where the accumulated contaminants are removed from the sorbent via a purge air stream and/or heat. The sorbent may be heated via a heat source (e.g., heater) while the purge air may or may not be heated. The combination of the effects of the heat and the purging air may remove some or all of the contaminants via temperature swing regeneration of the sorbents. In some embodiments, the system may be designed to switch from the adsorption mode to the regeneration mode automatically.

In some embodiments, with repeated adsorption and regeneration cycles, the sorbent may reach a saturation point where efficiency in removing contaminants is reduced significantly (though it generally occurs gradually). Such degradation may be irreversible due to changes in the chemical and physical properties of the sorbent, and thus, the sorbent may require replacement so as to improve in the performance of the sorbent and the air scrubbing system. Practical and proper installation, operation, and removal of the air scrubbing system (e.g., the scrubber and/or sorbents) may depend on the physical configuration of the sorbent in the scrubber. Accordingly, in some embodiments, one or more cartridges having sorbents arranged therein may be configured to allow quick and efficient replacement of spent sorbent so that the scrubbing system can be revitalized.

In some embodiments, the amount of sorbent to be encased in a cartridge may depend on the volume of air to be scrubbed, and/or amount, type, etc., of the contaminant in the airflow, as well as the number of cartridges to include. The cartridge configuration according to some embodiments may be configured with a relatively low pressure drop there-across, as thick sorbent beds can impede the flow of the air through the sorbent leading to high pressure drops. Correspondingly, in some embodiments, sorbent containing cartridges are provided which are configured for arrangement within a scrubbing system (e.g., air plenum) so as to substantially insure that little to no air (e.g., purge air, contaminated air, etc.) escapes around edges of the cartridge and the like (e.g., leaks, etc.). Since the maintenance of the air scrubbing system, such as replacing the sorbent and/or the cartridge, may be performed in the field where the system is installed, a convenient approach to accessing and maintaining the scrubbing system without entailing extensive disassembly work of the system is desirable. Examples of air scrubbers are disclosed in U.S. Pat. No. 8,157,892, titled "Method and System for Improved-Efficiency Air-Conditioning," filed May 17, 2011, the entire contents of which is incorporated by reference herein in its entirety.

With reference to FIGS. 1A-B, in some embodiments, a cartridge comprising sorbent material is shown in both exploded and assembled arrangements. FIG. 1A shows components of a cartridge 101 (shown assembled in FIG. 1B) configured for inclusion in an air scrubbing system. The cartridge 101 may comprise a sorbent bed 104 containing sorbent 102 for adsorbing air contaminants flowing through the cartridge 101. The sorbent 102 may come in different shapes and sizes, for example, granular solid material and/or a chunk of a monolith, which may be configured to fill portions of space within the cartridge frame 105. Alternatively, the sorbent may be a monolith of material filling the entire extent of the space within the cartridge frame 105. In some embodiments, granular sorbents can be particles that are much smaller than the partitions of the cartridge, and thus, the sorbent is distributed so as to fill the cartridge 101, or the compartments arranged therein. In some embodiments, the cartridge 101 may have any shape and size configured to fit in the air scrubbing system (e.g., length, width, thickness, subject to pressure drops—see above). For example, the cartridge 101 may be flat and may have any geometrical shape (e.g., rectangular, square, circular, etc.).

In some embodiments, the sorbent 102 may comprise any suitable material for capturing undesired substances from the air flowing through the cartridge 101 of the air scrubbing system. The type of sorbent used in the cartridge 101 of the air scrubbing system may depend, although not necessarily exclusively, on the types of contaminants to be removed from the contaminated air. For example, if the unwanted substance in the air is carbon dioxide, the active compound in the sorbent 102 may be an amine-based or amine-like compound. Examples of such amine-based active compounds comprise monoethanolamine (MEA), ethanolamine, methylamine, branchedpolyethyleneimine (PEI), linear polyethyleneimine (PEI), diethanolamine (DEA), dimethylamine, diethylamine, diisopropanolamine (DIPA) tetraethylenepentamine (TEPA), pentaethyleneheptamine (PEHA), methyldiethanolamine (MDEA), methylethanolamine, and/or any of a number of polyamines such as polyethylenimine, or a combination thereof, for example.

As another example, the contaminant in the air to be removed may be a plurality of volatile organic compounds, and the sorbent can be porous carbon, a molecular sieve, and/or a fiber based sorbent. In some embodiments, the sorbent may comprise a combination of some or all of the aforementioned sorbent materials.

In some embodiments, the sorbent bed 104 comprising sorbent 102 may be confined via air-permeable screens 103 with the cartridge frame 105, and preferably within the cartridge frame. Such screens 103 may comprise any structure which is permeable to air and thus having relatively low flow resistance. In some embodiments, the screen 103 may be an air permeable structure that is configured to maintain the shape of the cartridge 101 and/or the cartridge frame 105. For example, the screen 103 may be made from or reinforced by a permeable filter material such as, but not limited to a fiber sheet (e.g., natural fiber, synthetic filter, etc.), polymer sheet, perforated sheet, wood-based materials, cellulose fibers, paper cardboard, meshed/perforated structure (e.g., metal and/or plastic based sieve with holes and/or meshes to allow for the flow of air), and/or the like. In some embodiments, the screen 103 may comprise more than a single cover. For example, the screen 103 may include a plurality of the aforementioned and/or other air-permeable structures (e.g., on both sides of the cartridge and/or frame).

In some embodiments, the dimensions of the cartridge 101 are configured with respect to the properties of the scrubber and the sorbents 102 within the cartridge. Accordingly, the volumetric air flow F through each cartridge 101 can be expressed as the product of the surface area A of the cartridge 101 the air is flowing through and the face velocity, v:

$$F = A \times v$$

The air flow velocity may be determined by the pressure drop on the cartridge 101 and its flow resistance. As earlier noted, the thicker the layer of the sorbent bed 104, the greater flow resistance, and the same velocity can be sustained by a greater pressure drop. For example, a granular sorbent with average sorbent particles of approximately 0.5 millimeter diameter or any other size measurement (e.g. length, thickness, etc.), in a bed that is 1 inch (25 mm) thick, can create a static pressure drop of 100 Pascal at a face velocity of 5 cm/sec, or approximately 10 feet per minute (FPM). Conventional centrifugal fans commonly used in air handling systems can produce such pressure differences and thereby move air through the sorbent at such velocity. For example, a 60×60 $cm^2$ cartridge according to some embodiments may have a surface area of 4 $ft^2$ and therefore a volumetric flow of 40 CFM (cubic feet per minute); a 20 cartridge assembly can therefore handle 800 CFM. A cartridge of this specified volume can carry about 7 liters of sorbent volume. An increase in cartridge thickness allows for greater sorbent volume and fewer cartridges (having the same total sorbent volume), but at the cost of higher flow resistance and correspondingly more fan power. In some embodiments, the cartridge thickness is configured to be less than about 10 cm. In some embodiments, thinner cartridges may be configured, leading to reduced capacity due to lower sorbent volume. The reduced capacity can be compensated by increasing the number of cartridges, which may be beneficial in lowering fan power. The increased number of cartridges, however, may lead to higher cost due to more cartridge frames in the air scrubbing system. In some embodiments, smaller cartridges can be used, examples of which are a square cartridge of surface area 20×20 $cm^2$ and a rectangular one with dimensions of 15×30 $cm^2$.

With reference to FIG. 2, in some embodiments a regenerable air scrubbing system enclosure assembly 202 is provided and may comprise a plurality of arranged (e.g., horizontally) cartridges 201. Multiple cartridges for parallel air flow configuration, in some embodiments, allows for large sorbent volume for treating a large airflow without creating a great amount of airflow resistance and pressure drop. Since fluids/airflows typically prefer to flow in the path of least flow resistance, the contaminated air or the purge air may attempt to flow around the air scrubbing enclosure assembly 202 or around the cartridges 201 thereby avoiding the sorbent encased in the cartridges 201 and diminishing the effectiveness of the scrubber. Accordingly, cartridge configurations and arrangements of cartridges that urge all or a substantial portion of the airflow to flow through the sorbent may be used such that an arrangement of cartridges 201 is configured in the air scrubbing enclosure assembly 202. For example, for a primary air flow direction 203 shown in FIG. 2, a parallel configuration of cartridges 201 with gaps between neighboring cartridges, and arranged such that air flows through the cartridges and not around the cartridges (e.g., alternative paths that avoid the sorbents) may be used in constructing the air scrubbing enclosure assembly 202.

In some embodiments, the cartridges 201 may be positioned in parallel to or at a slight incline or tilt relative to the flow direction to encourage flow of the air through the cartridges and the sorbents. For example, the cartridges may all be parallel to each other. In some embodiments, neighboring cartridges 201 may be staggered with opposite tilts forming multiple V-patterns or "accordion" (zigzag) patterns. For example, the cartridges may be tilted at 10°, 5° or 2° or 1° (e.g., between about 1 degree to about 15 degrees) relative to air flow direction 203. The tilt angles of different cartridges 201 with respect to the air flow direction 203 may be the same or different. In some embodiments, the width of the gaps, and/or the incline angles may be determined based on the assembly size, expected air flow speed, air flow resistance, type of the contaminant to be removed from the air, amount, size, type, etc., of the sorbent in the cartridges 201, and/or the like. For example, very small gaps imply narrow air passages between the cartridges 201 with high flow resistance, whereas larger gaps increase the overall height of the cartridge stack, and thus the air scrubbing system or enclosure assembly 202. Examples of tilted cartridges in an air treatment system are disclosed in U.S. Pat. No. 8,690,999, titled "Modular, High-throughput Air Treatment System," filed Feb. 9, 2011, the entire contents of which is incorporated by reference herein in its entirety.

Each cartridge may include four edges, with two parallel to the longitudinal orientation of the assembly (e.g., along the air flow direction 203), and the other two are the lateral edges transverse to the longitudinal direction. In some embodiments, air flow coming into the air scrubbing assembly 202 along the air flow direction 203 enters between neighboring cartridges through the wider open gaps, but may be fully or partially blocked from entering or existing through the narrowed gaps (e.g., if the narrow gaps are sealed, air flow may be completely or substantially blocked). The blockage may urge the air to flow through the cartridge screens and the sorbents therein, and then to escape downstream through the next open lateral gap, and/or to flow through the next cartridge screens and the sorbents therein. The tilting of the cartridges may facilitate a larger air flow through the desired gaps while narrowing the passage towards the sealed edge. In some embodiments, to avoid the flow of air around the cartridges 201 (thereby avoid flowing through the sorbents), lateral edges may be substantially sealed along the inner walls of the assembly enclosure.

In some embodiments, cartridges 201 may be placed in the air scrubbing assembly 202 with structures that allow access to, and facilitate the operation of, the cartridges 201. For example, there may be rails, guides, grooves, etc., along the inner walls of the frame of the air scrubbing assembly 202 that mate with corresponding structures along the edges of the cartridges 201 so as to allow insertion and/or removal of the cartridges 201 in the air scrubbing assembly 202. Access to the cartridges 201 may further be facilitated by a panel or door on the air scrubbing assembly 202.

With reference to FIGS. 3A-B, in some embodiments, the air flow direction 303 may be substantially vertical (for example) or the air flow direction 307 may be at an incline to allow flow of the air through the cartridges 301. Correspondingly, the cartridges 301 in the air scrubbing assembly 302 may also be arranged vertically. For example, the substantially horizontally oriented cartridges discussed with reference to FIG. 2 may be rotated by about right angle to arrive at the cartridge arrangement depicted in FIG. 3A. As such, the discussion above with reference to FIG. 2 regarding gaps between cartridges, tilts of cartridges with respect to air flow direction and/or with respect to each other, structures like rails, guides, grooves, etc., that allow insertion and removal of cartridges in the air scrubbing assembly, etc., apply equally or substantially equally to vertically oriented cartridges 301.

However, in some embodiments, there may be some differences between vertically oriented cartridges and horizontally oriented cartridges. For example, as discussed with reference to FIG. 1, the sorbents in the cartridges 301 may be granular, and when the cartridges 301 are arranged substantially vertically, the granular sorbents may redistribute and/or settle within the cartridges 301, leading to a degraded ability to remove contaminants in the air flowing through the cartridges, and/or resulting in a reduced regeneration of the sorbents as the purge air passes through the cartridges without accessing the sorbent. For example, a substantial portion or all of the sorbents in a cartridge 301 may settle down to a bottom section 305 of the cartridge 301, leading to an upper section depleted of sorbents. The contaminated air may flow through this section with little or no filtering due to the reduced air flow resistance, or in the case of the purge air, the purge air may flow through the cartridge with little or no access to the sorbent and consequently without removing contaminants adsorbed to the sorbents In some embodiments, an air-impermeable rim 304 may be included in the cartridges 301 to reduce or eliminate the passage of air through such sorbent-depleted sections. The assembly of FIG. 3 may be formed with openings 310 to allow flow of air therein and/or thereout. In some embodiments, as will be discussed below especially with respect to FIG. 4, partitioning the cartridges into a plurality of compartments may alleviate the redistribution and settling of sorbents, and lead to an enhanced filtering of the contaminated air flowing through the compartmentalized cartridges and/or regeneration of the sorbents by the purge air. Examples of such rims are disclosed in U.S. Provisional Patent Application No. 62/046,174, titled "Vertical Enclosure Assemblies in Airflow Systems," filed Sep. 5, 2014, the entire contents of which is incorporated by reference herein in its entirety.

Figure 5A:
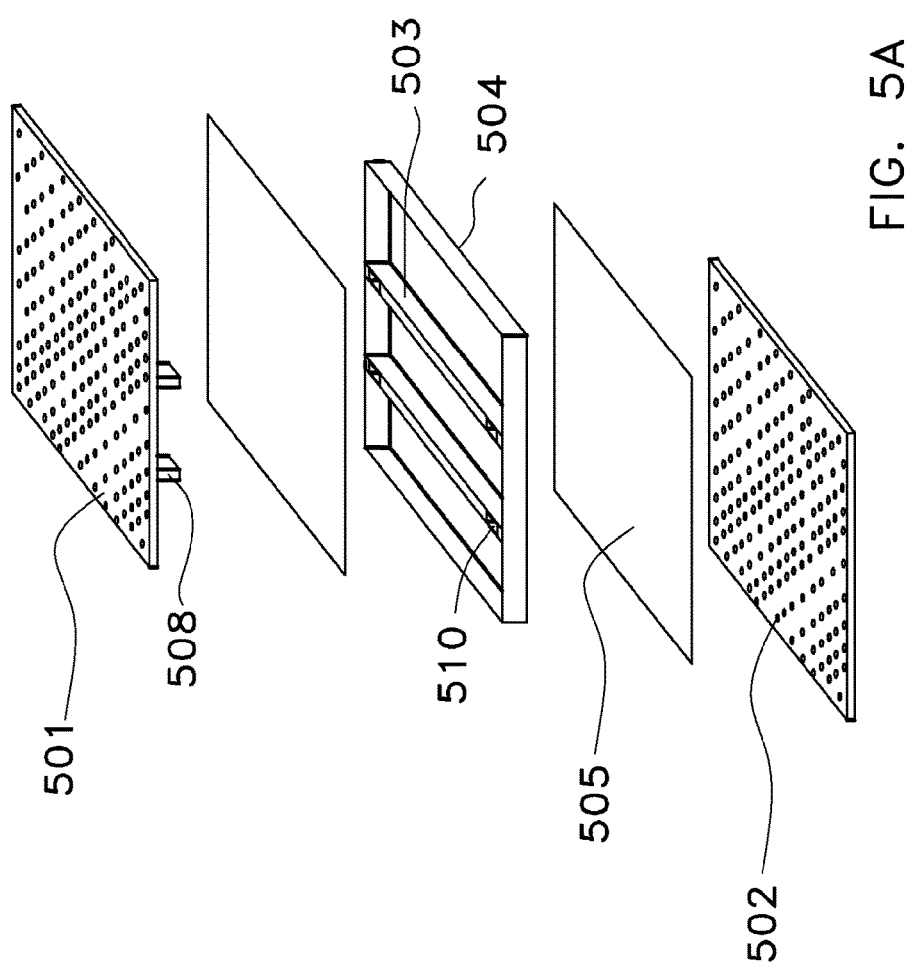
FIGS. 5A-B show exploded views of a cartridge comprising different types of screens according to some embodiments.
Figure 5B:
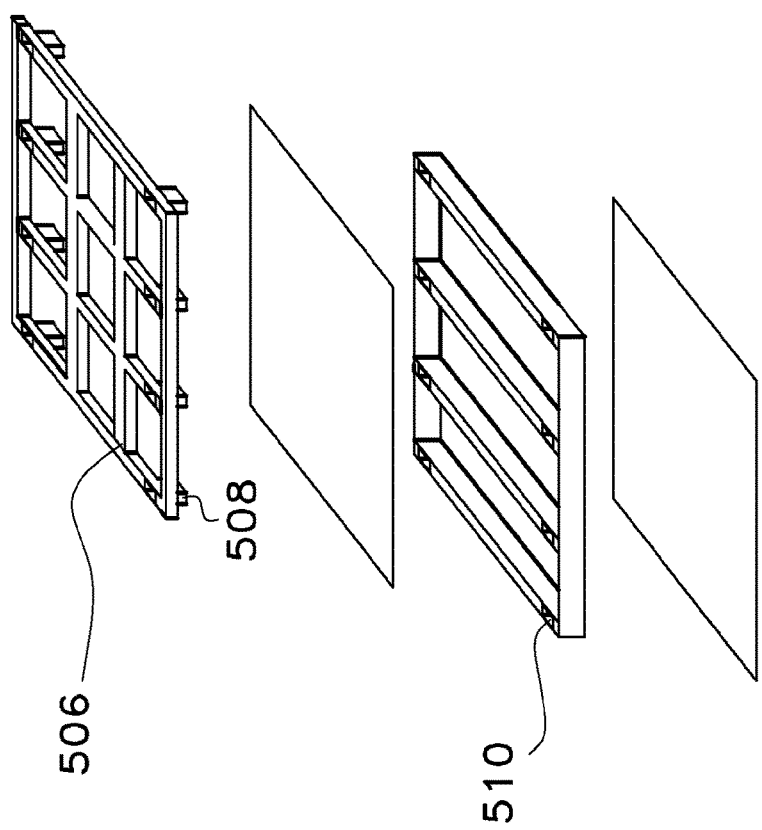

With reference to FIGS. 4A-D, in some embodiments, cartridges partitioned into a plurality of geometrically shaped compartments are shown. Partitions can provide mechanical strength to the frame 403 of the cartridge and help maintain the desirable distribution of granular sorbent. The space within the cartridge frame 403 that provides the exterior perimeter walls may be partitioned into a plurality of compartments 404 by partition walls 401. The shape, number, size, etc., of the partitions can be any suitable choice. For example, inner space of the cartridge may be partitioned into a lattice of a plurality of square compartments (FIG. 4A), triangular compartments (FIG. 4B), circular compartments (FIG. 4C), hexagonal compartments (FIG. 4D), and compartments of any desired shapes. For example, in some embodiments, the partitions can be longitudinal only, as shown in FIGS. 5A-B, where the cartridge is partitioned into three compartments. Longitudinally partitioned cartridge frames can be constructed using straight bars that attach to the edge pieces of the frame. In some embodiments, the compartments may not be of the same shape or size. For example, a cartridge may be partitioned into a plurality of compartments where the compartments assume any of the afore-mentioned shapes. Most or all of the compartments may contain a sorbent bed 402 comprising sorbents for removing contaminants from air flowing through the cartridge. In some embodiments, a single sorbent monolith may fill each compartment 404, or several monoliths placed side by side may be used together to fill each compartment 404. The sorbents from different compartments may be the same or different types.

As an example embodiment, a square cartridge with side length about 60 cm with a thickness of 25 mms may be partitioned into a honeycomb-like square lattice of 20 by 20 compartments, for a total of 400 square compartments. In some embodiments, the compartments may be sized larger or smaller, where more compartments lead to the use of more partitioning materials, but can provide greater structural strength and uniformity.

With reference to FIGS. 5A-B, in some embodiments, exploded views of a cartridge comprising different types of screens are shown. Frame partitions 503 and outer walls of cartridge frame 504 may be extruded aluminum profiles or any other suitable material formed in any suitable manufacturing method, designed with features that facilitate the attachment of the pieces to each other. Examples of suitable features that facilitate attachment between cartridge frame 504 and components of the cartridge such as frame partitions 503 can be grooves 510 and protrusions 508 that mate to provide, amongst other things, structural integrity to the combined structure. The entire frame 504 and partitions 503 can be a single solid element made of a suitable material, or the frame can be assembled from suitably chosen partition elements (for example). In such embodiments, the frame can be made from materials such as polymer, metal, composite material, wood-based materials, cellulose fibers, paper, cardboard and/or other natural fiber based sheet materials. Side walls and partitions may be provided with suitable folding of the materials. In constructing frames and/or partitions, conventional techniques may be used. For example, frames can be produced by conventional plastic injection molding techniques. The entire frame can be a single monolithic piece made by such technique. In some embodiments, the frame may then be covered with screens or covers on one or both of the top and bottom sides of the cartridges, with the sorbent inside and kept in place with the help of the cover.

The cover may be a single screen that is permeable to air and configured to maintain the shape of the cartridge it is covering. For example, the screen 505 may be a filter sheet (e.g., natural fiber, synthetic filter paper, cloth, etc.) that is meshed, perforated or otherwise configured to facilitate the flow of air while holding the sorbent in place. In some embodiments a perforated sheet of metal, paper or plastic material can be used to form or reinforce the screen. The cover may also comprise two or more parts. For example, the cover may have an air permeable screen 505 and another layer for maintaining the shape of the cartridge. Examples of the second layer are a perforated metal cover 501 (FIG. 5A) made with holes 502, and a metal mesh or sieve screen 506 (FIG. 5B). In some embodiments, the screen material may be secured as closely as possible to the partitions. In some embodiments, a polymer or metal screen can be attached to a polymer or metal frame by welding. In one embodiment, a polymer screen is attached to an injection-molded polymer frame using ultrasonic welding or thermal welding. Screens may be attached using adhesives, screws, rivets and/or the like.

Figure 6B:
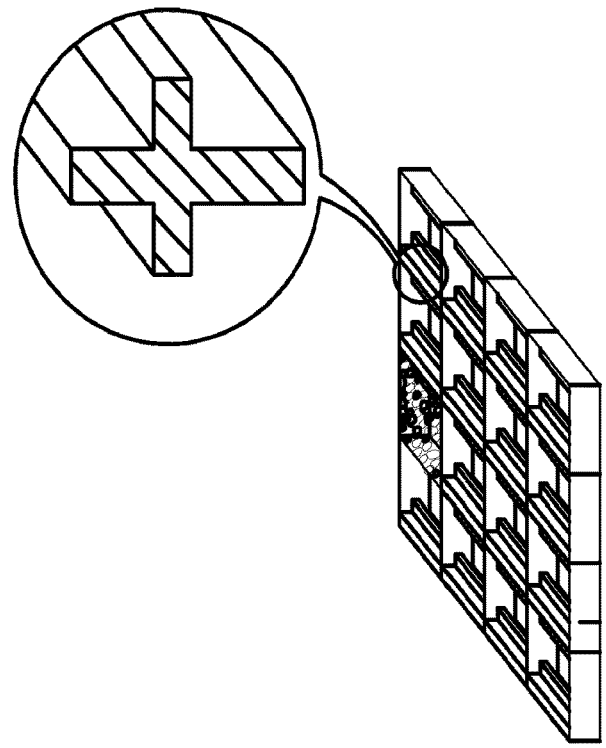
FIGS. 6A-B show airflow disrupting features on inner faces of the partition walls of the compartments of cartridges according to some embodiments.
Figure 6A:
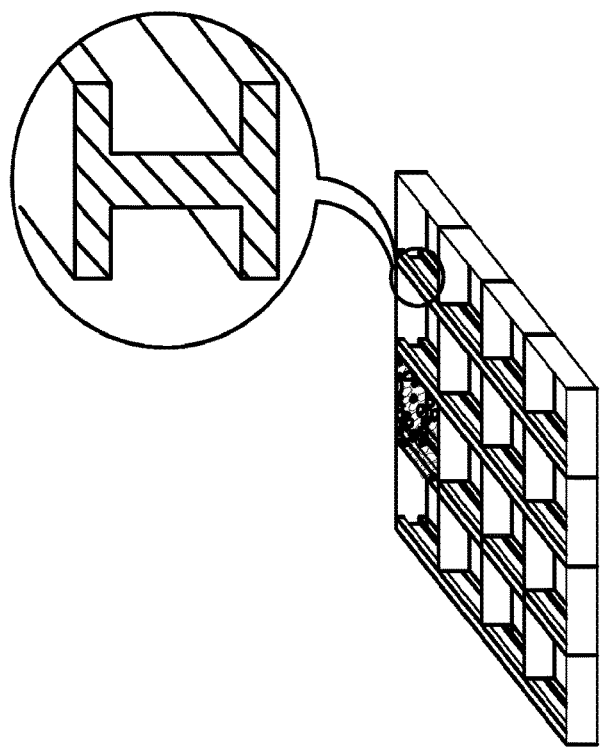

With reference to FIGS. 6A-D, in some embodiments, example features that disrupt airflow and further facilitate attachment between cartridge frames and components of cartridges such as frame partitions, are disclosed. For example, FIGS. 6A-B show example airflow disrupting features on the inner faces of the partition walls of the compartments of cartridges. The walls of the partitions may or may not be smooth and straight on all sides. For example, features such as ridges, bumps, grooves, tabs and/or any other physical variations and features can be formed in the partition walls to achieve desirable function or improved sorbent performance. In some embodiments, these features can be configured to facilitate the attachment of the screen material to the cartridge frame, such as, for example, an inner wall of the partition with an "I" profile shown in FIG. 6A. Examples of other features configured for attaching the screen to the walls include features with profiles where the cross section of the inner wall feature is thicker on the top and the bottom but thinner in the middle of the inner wall. The attachment can be facilitated by screws, glue, and/or any suitable manner. FIG. 6B shows an alternative embodiment where the inner wall feature has a "+" profile. Such features in particular disrupt airflow through the cartridge. In some embodiments, the inner wall may have any features that disrupt or impede air flow, such as protrusions, bumps, etc., of any shape. The presence of such features can increase the interaction of the flowing air with the sorbent material therein, and further assist in impeding air flow channels along the inner wall, which may result in part from settling or movement of the sorbent.

Figures 6C, 6D:
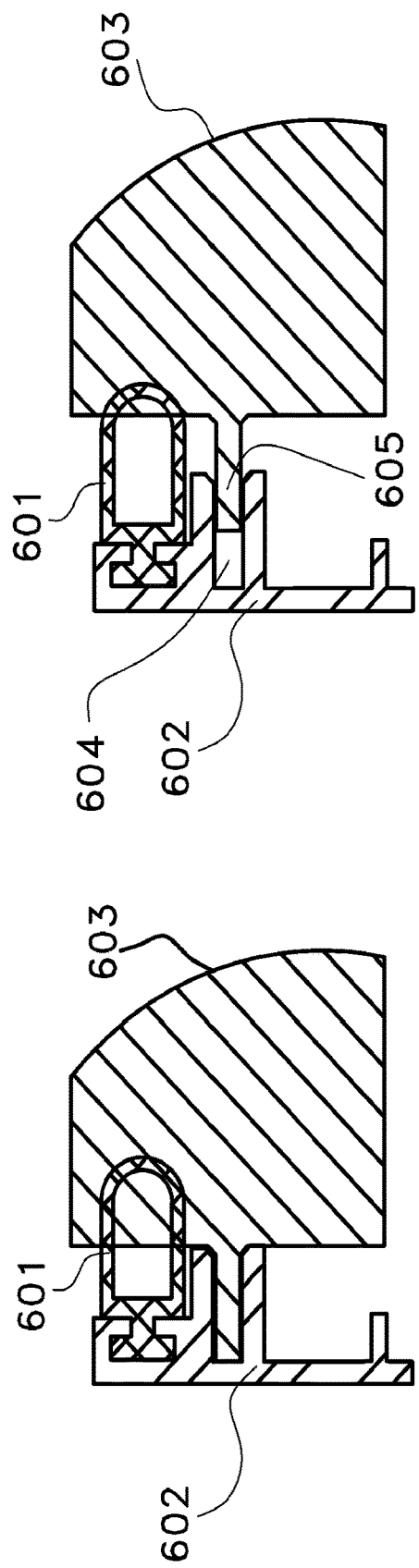
FIGS. 6C-D show mating of outer edges of a cartridge with matching features on the inside walls of the frame of the air scrubbing system according to some embodiments.

With reference to FIGS. 6C-D, in some embodiments, example illustrations of the mating of outer edges of a cartridge with matching features on the inside walls of the frame of the air scrubbing system are disclosed. The inside walls 602 of the air scrubbing assembly may have mating features 604 (e.g., slots, openings, grooves, ridges, receptacles, etc.) that match and/or receive mating elements 605 from the edges of the cartridge (e.g., protrusions). Other ridge dimensions and shapes of cartridge edge features are possible, with matching and interlocking features in the side rails of the assembly that receive and guide the cartridge insertion. For example, outer edges of the cartridge 603 may or may not be straight and flat. The cartridge 603 can be configured with ridges, grooves and/or other suitable features along the edges that can facilitate the horizontal sliding and final positioning of the cartridge 603 into the assembly. In some embodiments, both the cartridge features and the assembly features may comprise a cross sectional profile that extends lengthwise along the cartridge edge and the assembly rail, which is configured to fit or to interlock while allowing the cartridge to slide in and out. In some embodiments, the fitting and/or interlocking may be graduated.

For example, FIG. 6C shows a mating between features of the cartridge 603 and the assembly frame 602 where the overlap between the features is maximal. When the cartridge is in its final position, the interlocking ridges and trenches provide a stable mechanical support for fixing the cartridge position and may also perform a role of impeding air flow around the cartridge 603. In the embodiments shown in FIG. 6D, the overlap may not be complete (e g, minimal), and all the available space of the assembly's mating feature 604 may not be taken up by the corresponding features 605 of the cartridge. Such incremental or graduated fitting between the cartridge 603 and the assembly frame 602 may facilitate the positioning (e.g., sliding in and out) of the cartridge in the assembly and allow for manufacturing imperfections. Furthermore, extra tolerance provides allowance for thermal expansion and contraction that may occur in the scrubber under temperature swing regeneration. For example, ridges on opposing sides of the cartridge 603 mate with matching grooves or trenches configured in the assembly frame 602, allowing the cartridge to slide into position. In some embodiments, ridges can be used between cartridge 603 and the assembly frame 602. Injection molded frames or extruded frame pieces can be manufactured with the precise profile edge feature. Frames made of paper, wood-based materials, cellulose fibers cardboard or sheet metal can be bent, folded, cut or glued to form similar ridges. In some embodiments, there may be an optional gasket 601 to aid with the sealing of the interface between the cartridge 603 and the assembly frame 602.

The cardboard described herein may be formed of paperboard, corrugated fiberboard, and/or card stock or any other suitable material.

Figure 7:
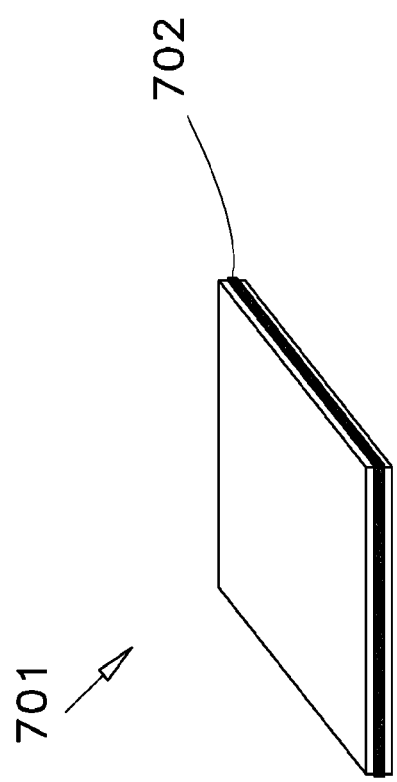
FIG. 7 shows an assembled cartridge comprising sealants on its edges according to some embodiments.

With reference to FIG. 7, in some embodiments, an assembled cartridge 701 comprising sealants 702 on its edges is shown. The sealant 702, which may be formed from foams, felt, rubber strips, and/or any other deformable material that can be shaped to any suitable form may be placed around some or the entire stretch of the periphery of the cartridge walls. Upon placement of the cartridge 701 within air scrubbing assembly, in some embodiments, the sealant 702 may press against the inside wall of the assembly and substantially prevent air flow from escaping away from the cartridge 701. As such, it facilitates the filtering of the contaminated air by forcing it to flow through the cartridge 701, and hence the sorbents in the cartridge 701. Similarly, by forcing the purge air to flow through the cartridge 701 and hence the sorbents, it may facilitate the regeneration of the sorbents (e.g., via temperature swing regeneration). Further, the sealant 702 may secure the placement of the cartridge 701 within the air scrubbing assembly, preventing the dislocation of the cartridge 701 from the assembly (e.g., when the contaminated or purge air is flowing at a high velocity).

In some embodiments, the sealant 702 may be placed on the assembly frame 602

With reference to FIGS. 8A-B, in some embodiments, example embodiments of cartridges configured for encasing replaceable sorbents are disclosed. In some embodiments, with repeated adsorption and regeneration cycles, sorbents in cartridges may degrade and their efficiency in removing contaminants from airflow may fall below an acceptable range, at which time, the cartridges may be replaced. In some embodiments, it may instead be desirable to design the air scrubbing system so as to allow the replacement of the degraded sorbents (instead of or in addition to replacing the cartridges) from the cartridges 802. In some embodiments, the sorbent 803 may be contained in packets, bags or any sorbent container 801 made from air permeable materials such as but not limited to natural fiber, synthetic filter paper, cloth, wood-based materials, cellulose fibers. The sorbents 803 may be contained in any number of sorbent containers 801. Once the sorbents inside the sorbent container 801 are exhausted, in some embodiments, the cartridges 802 may be opened, the sorbent container 801 containing used sorbent 803 may be replaced with a new container 801 without necessarily removing/replacing the cartridge. In such embodiments, the exhaustion of sorbent 803 inside a cartridge 802 may not necessarily lead to the replacement of the cartridge 802 itself.

FIG. 8A shows the container 801 prior to placeman within a receptacle 805 of the cartridge 802 and FIG. 8B shows the assembled cartridge 802. The receptacle 805 may be formed in any suitable manner with an air-permeable surface. The receptacle 805 may be formed with a cover 806 at least partially covering the container 801 and securing the container 801 within the receptacle 805.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A cartridge configured for scrubbing indoor air and regeneration in an air handling assembly comprising:
   a pair of opposed, substantially flat parallel surfaces configured in a geometric shape and configured with air-permeable surfaces including a polymer mesh;
   a frame arranged between the surfaces and configured to maintain the shape of the cartridge, the frame including a first plastic structure;
   a plurality of partition walls arranged as part of, within, or comprising the frame, the plurality of walls configured to: create a plurality of adjacently arranged compartments and include a second plastic structure; and
   a solid sorbent contained within the plurality of compartments and between the two surfaces, wherein:
      the plurality of walls are configured to provide structural strength to the cartridge and inhibit redistribution or motion of sorbent between compartments;
      the surfaces are configured to allow air to flow through the sorbent contained within the compartments; and
      the first plastic structure and/or the second plastic structure are attached to the polymer mesh via ultrasonic and/or thermal welding.

2. The cartridge of claim 1, wherein some of the partitions form a honeycomb pattern of repeated similar geometrical shapes comprising squares, rectangles, hexagons or triangles or a combination thereof.

3. The cartridge of claim 1, wherein the partitions are straight walls extending from one edge of the cartridge to its facing edge.

4. The cartridge of claim 3, wherein the partition walls are configured with perpendicular features to affect air flow or to facilitate the attachment of a screen.

5. The cartridge of claim 1, wherein the partitions and frame comprise a single structure made of at least one of: a polymer, plastic, composite material, a material produced by injection molding and a material produced by a molding technique.

6. The cartridge of claim 1, wherein the frame and the partitions are made partly or substantially of cellulose fibers such as paper, cardboard or wood-based materials.

7. The cartridge of claim 1, wherein the frame comprises external features extending along one or more of its edges, the edges comprising at least one of: ridges, protrusions, rims, tabs, tracks, grooves and indentations that are configured to facilitate the insertion of the cartridge into the assembly or secure each cartridge's position in the assembly.

8. The cartridge of claim 7, wherein the features extend along one or more of the edges of the frame and are configured to fit into and slide along matching rails or grooves to allow the cartridge to slide into and out of the assembly.

9. The cartridge of claim 1, wherein the air-permeable surfaces are created or reinforced by at least one of: a filter material, fiber sheet, polymer sheet, paper, screen, mesh and a perforated sheet.

10. The cartridge of claim 1, wherein the thickness of the cartridge is between about 0.5 centimeters and about 10 centimeters.

11. The cartridge of claim 1, wherein the sorbent is a granular material with a particle size of between about 0.1 mm to about 10 mm.

12. The cartridge of claim 1, wherein the sorbent contains organic amines for capture of carbon dioxide.

13. The cartridge of claim 1, wherein the sorbent is formed into a shaped monolith with such shape and size so as to match and fill the compartments.

14. The cartridge of claim 1, wherein the cartridge is configured for opening thereof to remove and replace the sorbent therein.

15. The cartridge of claim 1, wherein the solid sorbent is encased by air permeable packets contained within the plurality of compartments and between the two surfaces.

16. An assembly for removable sorbent cartridges in a self-regenerating air treatment system with a primary air flow direction that is substantially in a longitudinal direction, comprising
   a plurality of substantially planar rectangular cartridges arranged in a substantially parallel orientation to a primary air stream, with a tilt of no more than about 15 degrees relative to the primary air flow direction, the cartridges including a plastic frame and/or a plastic partition wall attached to an air-permeable surface via ultrasonic and/or thermal welding, the air-permeable surface including a polymer mesh; and
   a housing configured with internal structures comprising at least one of grooves, guides or channels configured to receive edges of the cartridges, the cartridge edges comprising two longitudinal edges and two lateral edges,
   wherein,
      fitting of the cartridges within the housing is configured such that air passages between adjacent cartridges are substantially blocked on both longitudinal edges and at least one lateral edge so as to force the air stream to pass through the cartridges.

17. The assembly of claim 16, wherein the primary air flow direction is substantially horizontal.

18. The assembly of claim 16, wherein the primary air flow direction is substantially vertical.

19. The assembly of claim 16, wherein the at least one of the cartridge edges and assembly features have profiles that interlock so as to provide a mechanically secure and/or air-tight connection.

20. The assembly of claim 16, wherein air passage blocking configuration is created along one or more of the edges of the cartridge via at least one of foam, felt, rubber or a deformable material that is configured in the assembly so as to come into contact with at least one of the cartridge edges.

* * * * *